(12) United States Patent
Shan

(10) Patent No.: US 11,209,701 B2
(45) Date of Patent: Dec. 28, 2021

(54) DISPLAY PANEL AND DISPLAY DEVICE

(71) Applicant: HKC Corporation Limited, Shenzhen (CN)

(72) Inventor: JianFeng Shan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/954,566

(22) PCT Filed: Sep. 11, 2018

(86) PCT No.: PCT/CN2018/105078
§ 371 (c)(1),
(2) Date: Jun. 17, 2020

(87) PCT Pub. No.: WO2019/119893
PCT Pub. Date: Jun. 27, 2019

(65) Prior Publication Data
US 2020/0319493 A1 Oct. 8, 2020

(30) Foreign Application Priority Data

Dec. 21, 2017 (CN) .......................... 201711393092.4

(51) Int. Cl.
*G02F 1/1339* (2006.01)
*G02F 1/1345* (2006.01)
(Continued)

(52) U.S. Cl.
CPC ........ *G02F 1/13394* (2013.01); *G02F 1/1368* (2013.01); *G02F 1/13452* (2013.01); *G02F 1/136286* (2013.01); *G02F 1/13396* (2021.01)

(58) Field of Classification Search
CPC ............. G02F 1/13394; G02F 1/13452; G02F 1/136286; G02F 1/1368; G02F 1/13396
(Continued)

(56) References Cited

U.S. PATENT DOCUMENTS

2004/0017538 A1* 1/2004 Yun ..................... G02F 1/13394
349/187
2008/0158496 A1* 7/2008 Kim ..................... G02F 1/13394
349/151
(Continued)

FOREIGN PATENT DOCUMENTS

CN 107490904 A 12/2017

*Primary Examiner* — Charles S Chang
(74) *Attorney, Agent, or Firm* — WPAT, PC

(57) ABSTRACT

A display panel and a display device are provided. The display panel includes: a first substrate, a second substrate, an active switch array, at least one gate driving circuit, at least one group of secondary spacing columns and a sealing section; the first substrate includes an active area and a peripheral area; the second substrate is opposite to the first substrate; the active switch array is located in the active area; the gate driving circuit is located in the peripheral area and connected to the active switch array; the secondary spacing columns are disposed on the second substrate and opposite to the peripheral area; the sealing section is disposed between the first substrate and the second substrate and located in the peripheral area. The sealing section, the first substrate, the second substrate and the secondary spacing columns together form a circuit disposition space.

18 Claims, 5 Drawing Sheets

(51) Int. Cl.
    *G02F 1/1362*   (2006.01)
    *G02F 1/1368*   (2006.01)
(58) Field of Classification Search
    USPC .................................................. 349/155–157
    See application file for complete search history.

(56) References Cited

U.S. PATENT DOCUMENTS

| | | | |
|---|---|---|---|
| 2015/0160497 A1* | 6/2015 | Sonoda ................. | G02F 1/1339 349/153 |
| 2016/0070127 A1* | 3/2016 | Ishikawa ............... | G02F 1/1368 349/42 |

* cited by examiner

DISPLAY PANEL AND DISPLAY DEVICE

FIELD OF THE DISCLOSURE

The disclosure relates to a display technical field, and more particularly to a display panel and a display device.

BACKGROUND

Promoted by requirements on thin electric products and low costs, various technologies have been gradually developed. For example, the gate driver on array (GOA) technology is directly integrating a gate driving circuit of the thin film transistor (TFT) array on a glass substrate to replace externally connected gate driving chips for achieving the objective of saving space and costs.

The gate driving circuit in an exemplary art is covered by liquid crystal molecules. Electrodes on the substrate will form the capacitance with the liquid crystal molecules between substrates to cause the resistance-capacitance (RC) load of the gate driving circuit is overwhelming, which influence the display device. Furthermore, the conventional gate driving circuit will be damaged due to exposure to air or poor protection.

SUMMARY

Embodiments of the disclosure provide a display panel and a display device for solving the problems of overwhelming RC load on the gate driving circuit and damage of the gate driving circuit.

In order to achieve the objectives above, an embodiment of the disclosure provides a display panel, including: a first substrate, a second substrate, an active switch array, at least one gate driving circuit, at least one group of secondary spacing columns and a sealing section; the first substrate includes an active area and a peripheral area; the second substrate is opposite to the first substrate; the active switch array is disposed on the first substrate and located in the active area; the at least one gate driving circuit is disposed on the first substrate and located in the peripheral area. The at least one gate driving circuit is connected to the active switch array and configured to drive the active switch array; the at least one group of secondary spacing columns are disposed on the second substrate opposite to the peripheral area; the sealing section is disposed between the first substrate and the second substrate and located in the peripheral area. The sealing section, the first substrate, the second substrate and the at least one group of secondary spacing columns together form a circuit disposition space; the at least one group of secondary spacing columns and the at least one gate driving circuit are located in the circuit disposition space, and each group of the secondary spacing columns are spaced from a corresponding gate driving circuit.

In an embodiment, the display panel further includes: a number of signal bus lines disposed on the first substrate and located in the peripheral area; the signal bus lines are connected to the at least one gate driving circuit, and the signal bus lines are located in the circuit disposition space.

In an embodiment, the at least one group of secondary spacing columns are located above the at least one gate driving circuit and the signal bus lines and covering the at least one gate driving circuit and the signal bus lines.

In an embodiment, the display panel further includes: a liquid crystal layer disposed between the first substrate and the second substrate correspondingly to the active area. The liquid crystal layer includes a number of liquid crystal molecules. The active switch array is configured to control a motion of the liquid crystal molecules.

The sealing section includes a first sealant and a second sealant; the first sealant is disposed between the first substrate and the second substrate and located in the peripheral area; the second sealant is disposed between the first substrate and the second substrate and located in the peripheral area; the second sealant, the at least one group of secondary spacing columns, the first sealant, the first substrate and the second substrate together form the circuit disposition space.

In an embodiment, the first sealant is located on an external side of the second sealant, and the second sealant is further configured to seal the liquid crystal layer.

In an embodiment, the first sealant compasses the second sealant; the gate driving circuit is in a vacuum and a load capacitance thereof is $C=\varepsilon 0 * A/d$, where $\varepsilon 0$ is a vacuum dielectric coefficient, A is a relative coverage area of polar plates, and d is a distance between the polar plates.

In an embodiment, the display panel includes two gate driving circuits, and the two gate driving circuits are located at two opposite sides of the active switch array.

In an embodiment, the two gate driving circuits are connected to the active switch array and configured to drive the active switch array.

In an embodiment, the display panel further includes: a number of primary spacing columns disposed between the first substrate and the second substrate correspondingly to the active area for forming a number of gaps between the first substrate and the second substrate.

In an embodiment, a height of the primary spacing columns is larger than a height of the secondary spacing columns.

An embodiment of the disclosure provides a display device, including: a backlight module and any one of the display panels above; the backlight module is configured to provide a backlight illumination to the display panel.

An embodiment of the disclosure provides a display panel, including: a first substrate, a second substrate, an active switch array, at least one gate driving circuit, at least one group of secondary spacing columns and a sealing section; the first substrate includes an active area and a peripheral area; the second substrate is opposite to the first substrate; the active switch array is disposed on the first substrate and located in the active area; the at least one gate driving circuit is disposed on the first substrate and located in the peripheral area. The at least one gate driving circuit is connected to the active switch array and configured to drive the active switch array; the at least one group of secondary spacing columns are disposed on the second substrate opposite to the peripheral area; the sealing section includes a first sealant and a second sealant. The first sealant is disposed between the first substrate and the second substrate and located in the peripheral area. The second sealant is disposed between the first substrate and the second substrate and located in the peripheral area; the second sealant, the first sealant, the first substrate, the second substrate and the at least one group of secondary spacing columns together form a circuit disposition space; the at least one group of secondary spacing columns and the at least one gate driving circuit are located in the circuit disposition space, and each group of the secondary spacing columns are spaced from a corresponding gate driving circuit; the gate driving circuit is in a vacuum and a load capacitance thereof is $C=\varepsilon 0 * A/d$, where $\varepsilon 0$ is a vacuum dielectric coefficient, A is a relative coverage area of polar plates, and d is a distance between the polar plates.

According to the display panel and the display device of the embodiment of the disclosure, the second substrate is formed with numerous secondary spacing columns. The gate driving circuit is disposed in the peripheral area of the first substrate. The sealing section, the numerous secondary spacing columns, the first substrate and the second substrate form the circuit disposition space. The secondary spacing columns are fully disposed above the gate driving circuit to effectively isolate liquid crystal molecules and form the aforementioned circuit disposition space. The gate driving circuit and the secondary spacing columns are located in the circuit disposition space to reduce the RC load and prevent the secondary spacing columns from scratching the gate driving circuit.

BRIEF DESCRIPTION OF THE DRAWINGS

In order to better illustrate embodiments of the disclosure or the prior art, drawings in need for describing the embodiments or the prior art will be briefly introduced as follows, apparently, the drawings in the description below are some embodiments of the disclosure, and a person skilled in the art can obtain other figures according to the drawings without any creativity.

DETAILED DESCRIPTION OF PREFERRED EMBODIMENTS

Figure 1:
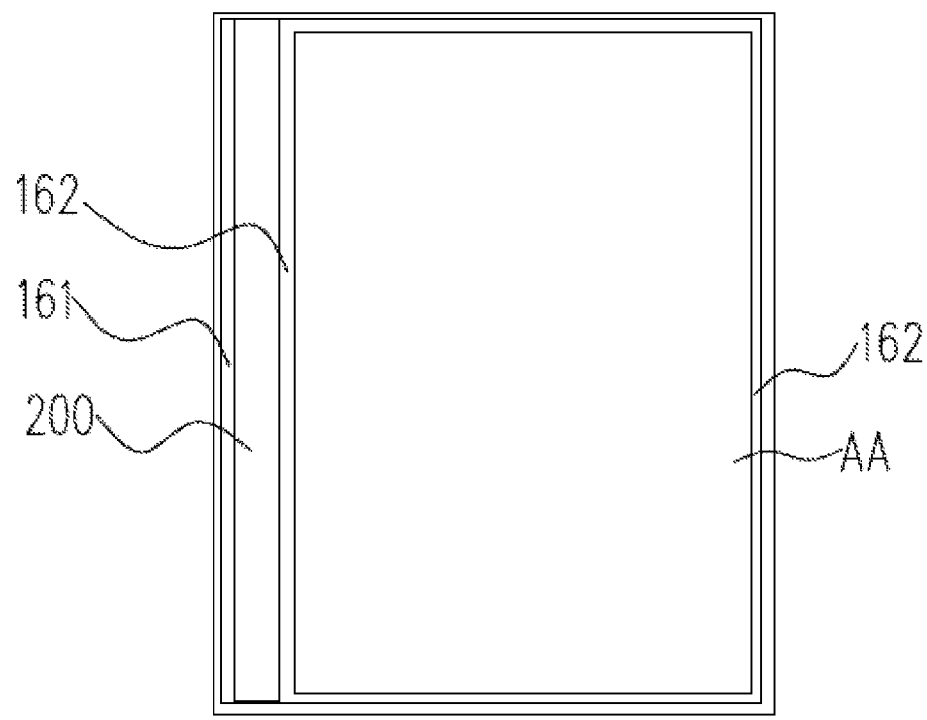
FIG. 1 is a top schematic view of a display panel according to an embodiment of the disclosure.

In order to further clarify the objective and advantage of the disclosure, the disclosure will be described in detail with reference to concrete embodiments and accompanying drawings as follows. Apparently, the illustrated drawings are merely some rather than all of the embodiments of the disclosure. All the other embodiments obtained by a person skilled in the art based on the embodiments in the disclosure without any creativity should belong to the protective scope of the disclosure.

The illustration of each embodiment is referred to the accompanying drawing for illustrating the specific embodiment to fulfill the disclosure. Directional terms mentioned in the disclosure, such as "on", "below", "front", "back", "left", "right", "inside", "outside", "lateral" and the like purely are the directions in the accompanying drawings. Therefore, the employed directional terms are for illustrating and understanding the disclosure instead of limiting the disclosure.

The drawings and the illustration are acted to be exemplary instead of restrictive. In the drawings, elements with the similar structure are represented by the same label.

Moreover, for the convenience of comprehension and description, sizes and thicknesses of the devices shown in the figures are random, and the disclosure will not be restricted accordingly.

In the drawings, for the sake of clarification, thicknesses of layers, films, panels, regions, etc. are exaggerated. In the drawings, for the convenience of comprehension and description, thicknesses of some layers and regions are exaggerated. When an element such as a layer, a film, a region or a base is stated to be "on" another element, the element can be directly on another element, or an intermediate element could exist.

Furthermore, in the disclosure, unless otherwise indicated, the word "include" depicts including the element without excluding any other elements.

An embodiment of the disclosure provides a display panel. The display panel can include: a first substrate, a second substrate, an active switch array, at least one gate driving circuit, at least one group of secondary spacing columns and a sealing section. The first substrate has an active area and a peripheral area, and the second substrate is disposed opposite to the first substrate. The active switch array is disposed on the first substrate and located in the active area. At least one gate driving circuit is disposed on the first substrate and located in the peripheral area; specifically, at least one gate driving circuit is disposed on the first substrate and located on the periphery of the active switch array; at least one gate driving circuit is connected to the active switch array and configured to drive the active switch array. At least one group of secondary spacing columns are disposed on the second substrate and opposite to the peripheral area. Each group of the secondary spacing columns are corresponding to one gate driving circuit. Optionally, the display panel further can include: at least one secondary spacing column region. Each secondary spacing column region is fully distributed with the secondary spacing columns. The sealing section is disposed between the first substrate and the second substrate and located in the peripheral area. The sealing section, the first substrate, the second substrate and the at least one group of secondary spacing columns together form a circuit disposition space; the at least one group of secondary spacing columns and the at least one gate driving circuit are located in the circuit disposition space, and each group of the secondary spacing columns is spaced from a corresponding gate driving circuit. In other words, each group of secondary spacing columns are separated from the corresponding gate driving circuit with a distance. The display panel of the embodiment can be a liquid crystal display panel, an organic light emitting diode (OLED) display panel, a quantum dot light emitting diode (QLED) display panel, a curved display panel or other display panels. Detailed illustration will be provided with reference to each of the drawings as follows.

Figure 2:
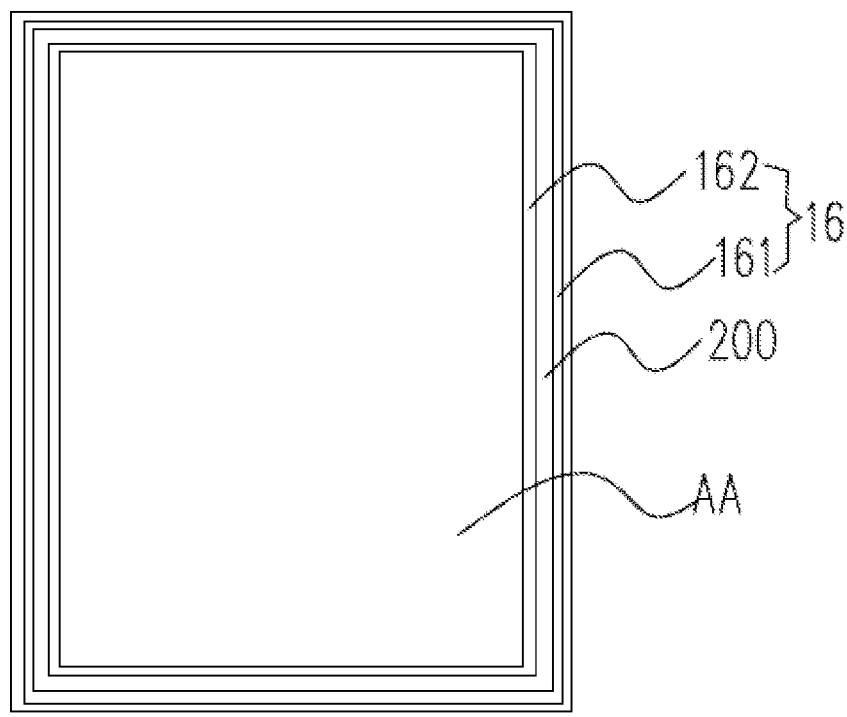
FIG. 2 is a top schematic view of a display panel according to another embodiment of the disclosure.
Figure 3:
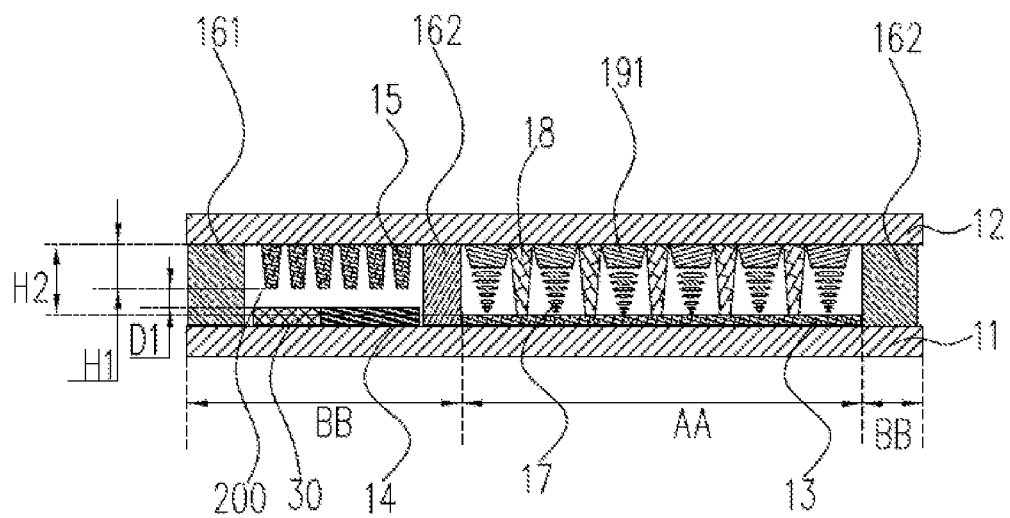
FIG. 3 is a cross-sectional schematic view of a display panel according to an embodiment of the disclosure.
Figure 4:
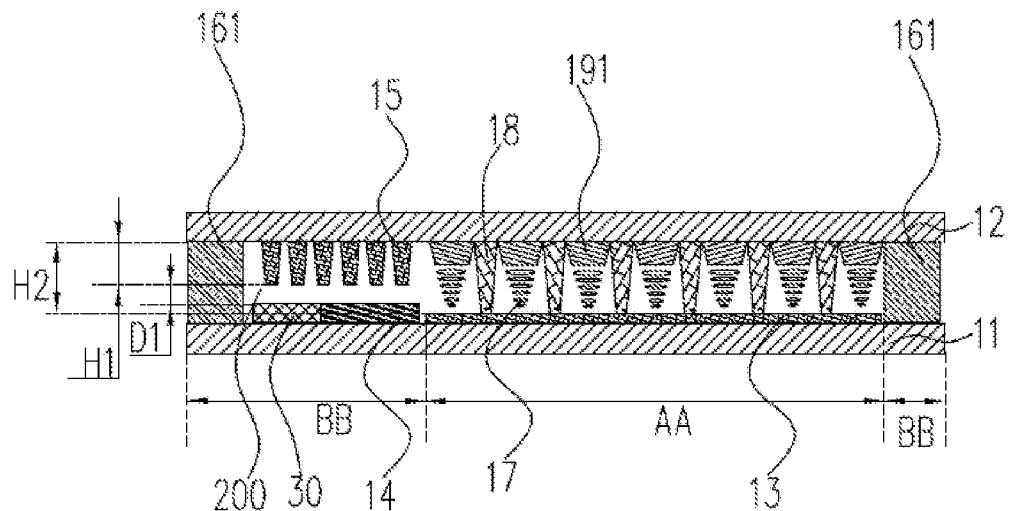
FIG. 4 is a cross-sectional schematic view of a display panel according to another embodiment of the disclosure.

FIG. 1 is a top schematic view of a display panel according to an embodiment of the disclosure; FIG. 2 is a top schematic view of a display panel according to another embodiment of the disclosure; FIG. 3 is a cross-sectional schematic view of a display panel according to an embodiment of the disclosure; FIG. 4 is a cross-sectional schematic view of a display panel according to another embodiment of the disclosure. FIG. 3 and FIG. 4 take the display panel including one gate driving circuit and one group of secondary spacing columns as example. As shown in FIG. 1, FIG. 2, FIG. 3 and FIG. 4, the display panel can include: a first substrate 11, a second substrate 12, an active switch array 13, a first gate driving circuit 14, first secondary spacing columns 15, a first sealing section 16, a liquid crystal layer 17 and primary spacing columns 18. The first substrate includes an active area AA and a peripheral area BB; the second substrate 12 is disposed opposite to the first substrate 11. The active switch array 13 is disposed on the first substrate 11 and located in the active area AA. The first gate driving circuit 14 is disposed on the first substrate 11 and located in the peripheral area BB; specifically, the first gate driving circuit 14 is disposed on the first substrate 11 and located on a first side of the active switch array 13. The first gate driving circuit 14 is connected to the active switch array 13 and configured to drive the active switch array 13. The first secondary spacing columns 15 are disposed on the second substrate 12 and opposite to the peripheral area BB. The first sealant 16 is disposed between the first substrate 11 and the second substrate 12 and located in the peripheral area BB. The first sealant 16, the first substrate 11, the second substrate 12 and the first secondary spacing columns 15 together form a first circuit disposition space 200; the first secondary spacing columns 15 and the first gate driving circuit 14 are located in the first circuit disposition space 200. Moreover, the first secondary spacing columns 15 are spaced from the first gate driving circuit 14 with a first distance D1; in other words, the first distance D1 is between the first secondary spacing columns 15 and the first gate driving circuit 14, or the first distance D1 separates the first secondary spacing columns 15 from the first gate driving circuit 14, or the first secondary spacing columns 15 and the first gate driving circuit 14 are uncontacted. The liquid crystal layer 17 is disposed between the first substrate 11 and the second substrate 12 and corresponding to the active area AA; specifically, the liquid crystal layer 17 corresponds to the active switch array 13. The liquid crystal layer 17 includes liquid crystal molecules. The active switch array 13 and a pixel electrode array (not shown) are combined to control the motion of liquid crystal molecules. The primary spacing columns 18 are disposed between the first substrate 11 and the second substrate 12 for forming gaps between the first substrate 11 and the second substrate 12.

According to the embodiment, the second substrate is formed with the secondary spacing columns. The gate driving circuit is disposed on the peripheral area of the first substrate. The sealing section, the secondary spacing columns, the first substrate and the second substrate are utilized to form the circuit disposition space. The secondary spacing columns are fully distributed above the gate driving circuit to effectively isolate liquid crystal molecules and form the aforementioned circuit disposition space. The gate driving circuit and the secondary spacing columns are located in the circuit disposition space to reduce the RC load and the entire capacitance, and the secondary spacing columns and the gate driving circuit are separated to prevent the secondary spacing columns from scratching the gate driving circuit.

In an embodiment of the disclosure, a height H2 of the primary spacing columns 18 is larger than a height H1 of the secondary spacing columns 15.

In an embodiment of the disclosure, as shown in FIG. 3 and FIG. 4, the display panel further can include signal bus lines 30. The signal bus lines 30 are disposed on the first substrate 11 and located in the peripheral area BB. The signal bus lines 330 are connected to the first gate driving circuit 14. The signal bus lines 30 are located in the first circuit disposition space 200 and opposite to the first secondary spacing columns 15. The signal bus lines 30 can be configured to provide clock signals to the first gate driving circuit 14.

In an embodiment of the disclosure, the display panel further can include a first secondary spacing column region. The first secondary spacing column region is fully distributed with the first secondary spacing columns 15. Specifically, the first secondary spacing column region is opposite to the first gate driving circuit 14 and the signal bus lines 30. In detail, the first secondary spacing columns 15 are fully filled above the first gate driving circuit 14 and the signal bus lines 30, in other words, the first secondary spacing column region/the first secondary spacing columns 15 is/are located above the first gate driving circuit 14 and the signal bus lines 30 and covering the first gate driving circuit 14 and the signal bus lines 30.

According to the display panel and the display device in the embodiment, the second substrate is formed with numerous secondary spacing columns. The gate driving circuit and the signal bus lines are disposed in the peripheral area of the first substrate. The sealing section, the numerous secondary spacing columns, the first substrate and the second substrate are utilized to form the circuit disposition space. The secondary spacing columns are fully disposed above the gate driving circuit and the signal bus lines to effectively isolate liquid crystal molecules and form the aforementioned circuit disposition space. The gate driving circuit, the signal bus lines and the secondary spacing columns are located in the circuit disposition space to reduce the RC load and the entire capacitance, and the secondary spacing columns and the gate driving circuit are separated to prevent the secondary spacing columns from scratching the gate driving circuit.

In an embodiment of the disclosure, as shown in FIG. 1, FIG. 2 and FIG. 3, the first sealant 16 can include: a first sealant 161 and a second sealant 162. The second sealant 162, the first secondary spacing columns 15, the first sealant 161, the first substrate 11 and the second substrate 12 together form the first circuit disposition space 200.

In an embodiment of the disclosure, as shown in FIG. 1, FIG. 2 and FIG. 3, the first sealant 161 is located on an external side of the second sealant 162. The second sealant 162 is further configured to seal the liquid crystal layer 17. The design is benefit for narrowing the border of the display device as the sealing section can simultaneously form the circuit disposition space and seal the liquid crystal layer 17. Apparently, in another embodiment of the disclosure, the second sealant 162 can be merely for forming the circuit disposition space with the first secondary spacing columns 15, the first sealant 161, the first substrate 11 and the second substrate 12 without sealing the liquid crystal layer 17. The liquid crystal layer 17 is sealed in another way.

In an embodiment of the disclosure, as shown in FIG. 2, the first sealant 161 can further compass the second sealant 162, namely when the second sealant 162 surrounds the liquid crystal layer 17, the first sealant 161 encloses the second sealant 162 to form a double sealant. The design can help reduce the difficulty of the manufacturing process because structures of the first sealant 161 and the second sealant 162 are the same. Moreover, according to the formula of parallel capacitors $C=\varepsilon 0*\varepsilon r*A/d$, where $\varepsilon 0$ is a vacuum dielectric coefficient, $\varepsilon r$ is a relative permittivity of the material between polar plates, A is a relative coverage area between polar plates, and d is a distance between the polar plates; as the double sealant is designed to effectively insulate the liquid crystal on the gate driving circuit to allow the gate driving circuit in the vacuum. The load capacitance of the gate driving circuit consequently turns from the original $\varepsilon 0*\varepsilon r*A/d$ to $\varepsilon 0*A/d$, resulting in reducing the capacitance of the gate driving circuit effectively. Apparently, in another embodiment of the disclosure, as shown in FIG. 1, the first sealant 161 can only locate on one side of the second sealant 162. The design can spare materials and benefit the narrow border design.

In an embodiment of the disclosure, as shown in FIG. 4, the first sealing section 16 can include the first sealant 161. The first sealant 161, the first secondary spacing columns 15, the first substrate 11 and the second substrate 12 form the first circuit disposition space 200.

In an embodiment of the disclosure, the active switch array 13 includes thin film transistors. The gate driving circuit provides the voltage to gate electrodes of the thin film transistors.

In an embodiment of the disclosure, the GOA technology can be applied to integrate the gate driving circuit into the first substrate for driving the active switch array consisting of amorphous silicon (a-Si) thin film transistors; however, in various embodiments, the gate driving circuit integrated into the first substrate 11 by the GOA technology can further be used to drive the active switch array consisting of polycrystalline silicon (poly-Si) thin film transistors. The poly-Si thin film transistors can be formed by technologies such as the low temperature poly-silicon (LTPS). Moreover, in other embodiments, the gate driving circuit can be integrated into the substrate by other methods.

In an embodiment of the disclosure, as shown in FIG. 3 and FIG. 4, the display panel can further include a color filter layer. The color filter layer includes color photoresists 191; FIG. 3 and FIG. 4 show several color photoresists 191. The color photoresists 191 can be red, green, blue photoresists. The color filter layer is disposed on the second substrate 12. Apparently, in another embodiment of the disclosure, in order to increase the aperture ratio, the color filter layer can further be disposed on the first substrate 11, and the liquid crystal layer 17 is located on the color filter layer and the active switch array 13.

Figure 5:
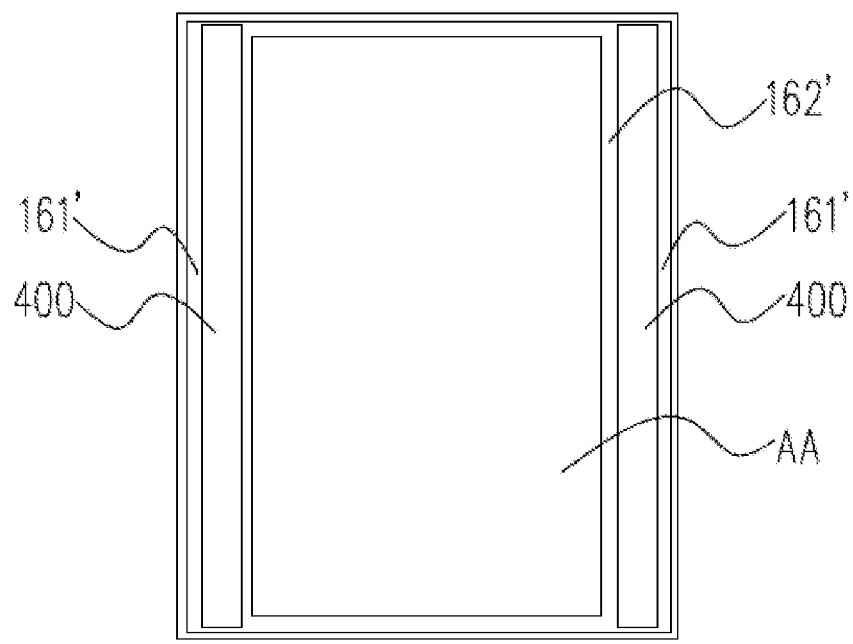
FIG. 5 is a top schematic view of a display panel according to another embodiment of the disclosure.
Figure 6:
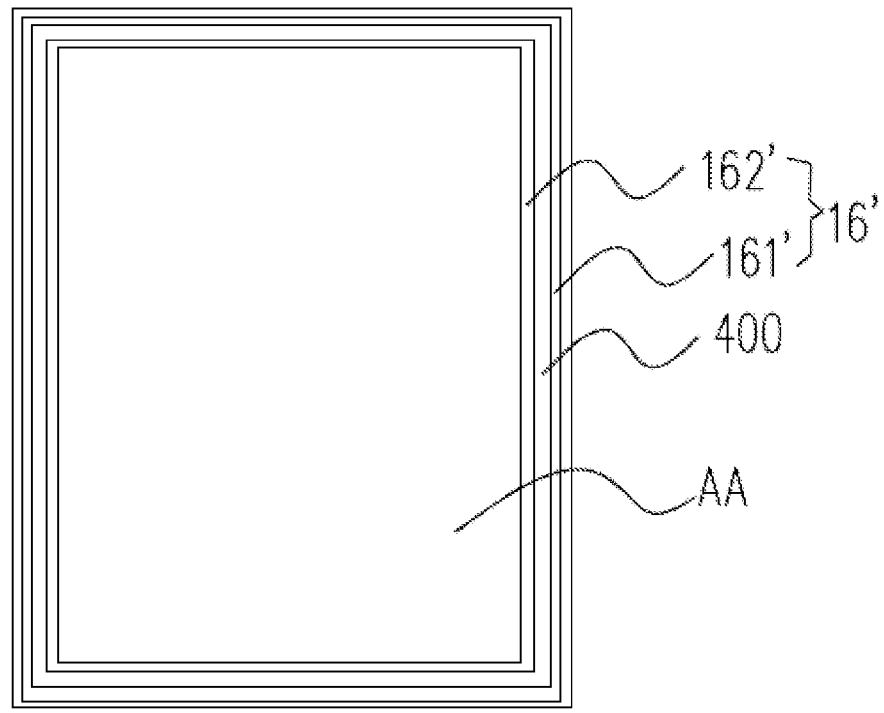
FIG. 6 is a top schematic view of a display panel according to another embodiment of the disclosure.
Figure 7:
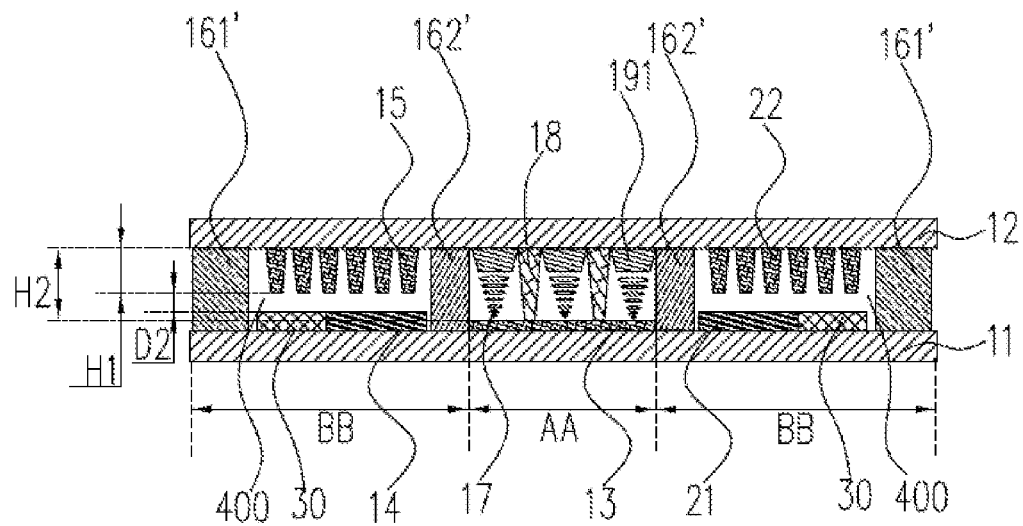
FIG. 7 is a cross-sectional schematic view of a display panel according to another embodiment of the disclosure.
Figure 8:
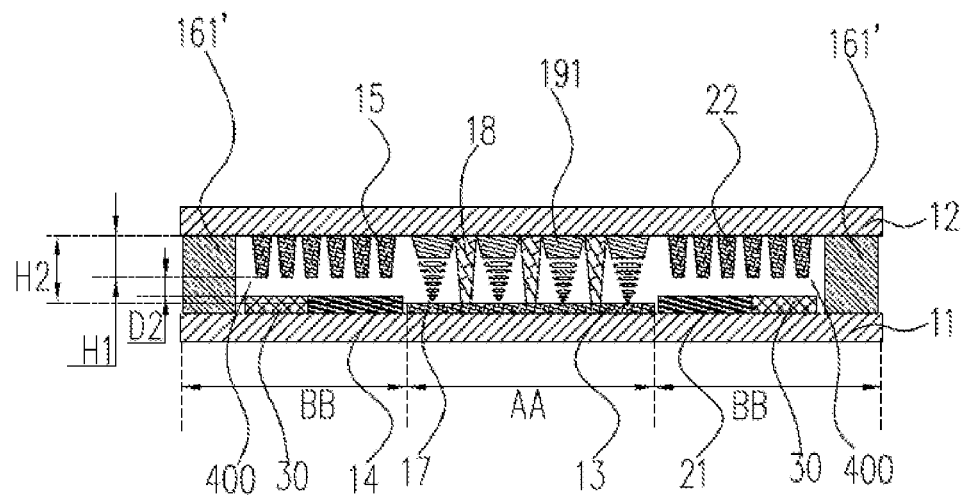
FIG. 8 is a cross-sectional schematic view of a display panel according to another embodiment of the disclosure.

FIG. 5 is a top schematic view of a display panel according to another embodiment of the disclosure; FIG. 6 is a top schematic view of a display panel according to another embodiment of the disclosure; FIG. 7 is a cross-sectional schematic view of a display panel according to another embodiment of the disclosure; FIG. 8 is a cross-sectional schematic view of a display panel according to another embodiment of the disclosure. FIG. 7 and FIG. 8 include the display panel with two gate driving circuits and two groups of secondary spacing columns as example for illustration. The display panel in FIG. 7 and FIG. 8 can include: the first substrate 11, the second substrate 12, the active switch array 13, the first gate driving circuit 14, the first secondary spacing columns 15, a second gate driving circuit 21, second secondary spacing columns 22, a second sealant 16', the liquid crystal layer 17 and the primary spacing columns 18.

The first substrate 11 includes the active area AA and the peripheral area BB; the second substrate 12 is disposed opposite to the first substrate 11. The active switch array 13 is disposed on the first substrate 11 and located in the active area AA. The first gate driving circuit 14 is disposed on the first substrate 11 and located in the peripheral area BB; specifically, the first gate driving circuit 14 is disposed on the first substrate 11 and located on a first side of the active switch array 13. The second gate driving circuit 21 is disposed on the first substrate 11 and located in the peripheral area BB; specifically, the second gate driving circuit 21 is disposed on the first substrate 11 and located on a second side of the active switch array 13. The first gate driving circuit 14 and the second gate driving circuit 21 are connected to the active switch array 13 and configured to drive the active switch array 13. The first secondary spacing columns 15 and the second secondary spacing columns 22 are disposed on the second substrate 12 and opposite to the peripheral area BB. The second sealant 16' is disposed between the first substrate 11 and the second substrate 12 and located in the peripheral area BB. The second sealant 16', the first secondary spacing columns 15, the second secondary spacing columns 22, the first substrate 11 and the second substrate 12 together form a second circuit disposition space 400; the first secondary spacing columns 15, the first gate driving circuit 14, the second secondary spacing columns 22 and the second gate driving circuit 21 are located in the second circuit disposition space 400.

Moreover, the first secondary spacing columns 15 are spaced from the first gate driving circuit 14 with the first distance D1 (referring to FIG. 3); in other words, the first distance D1 is between the first secondary spacing columns 15 and the first gate driving circuit 14, or the first distance D1 separates the first secondary spacing columns 15 from the first gate driving circuit 14, or the first secondary spacing columns 15 and the first gate driving circuit 14 are uncontacted. In addition, the second secondary spacing columns 22 are spaced from the second gate driving circuit 21 with a second distance D2; in other words, the second distance D2 is between the second secondary spacing columns 22 and the second gate driving circuit 21, or the second distance D2 separates the second secondary spacing columns 22 from the second gate driving circuit 21, or the second secondary spacing columns 22 and the second gate driving circuit 21 are uncontacted. The second distance D2 and the first distance D1 are the same, apparently, in practical application, the second distance D2 and the first distance D1 can further be different.

The liquid crystal layer 17 is disposed between the first substrate 11 and the second substrate 12 and corresponding to the active area AA; specifically, the liquid crystal layer 17 corresponds to the active switch array 13. The liquid crystal layer 17 includes liquid crystal molecules. The active switch array 13 is configured to control the motion of liquid crystal molecules. The primary spacing columns 18 are disposed on the active area AA with the liquid crystal layer 17 between the first substrate 11 and the second substrate 12 for forming gaps between the first substrate 11 and the second substrate 12.

According to the embodiment, the second substrate is formed with the secondary spacing columns. The gate driving circuit is disposed on the peripheral area of the first substrate. The sealing section, the secondary spacing columns, the first substrate and the second substrate are utilized to form the circuit disposition space. The secondary spacing columns are fully distributed above the gate driving circuit to effectively isolate liquid crystal molecules and form the aforementioned circuit disposition space. The gate driving circuit and the secondary spacing columns are located in the circuit disposition space to reduce the RC load and the entire capacitance, and the secondary spacing columns and the gate driving circuit are separated to prevent the secondary spacing columns from scratching the gate driving circuit.

In an embodiment of the disclosure, the height H2 of the primary spacing columns 18 is larger than the height H1 of the secondary spacing columns 15 and 22 to effectively prevent the secondary spacing columns from scratching the gate driving circuits.

In an embodiment of the disclosure, as shown in FIG. 7 and FIG. 8, the display panel further can include signal bus lines 30. The signal bus lines 30 are disposed on the first substrate 11 and located in the peripheral area BB. The signal bus lines 30 are connected to the first gate driving circuit 14 and the second gate driving circuit 21. The signal bus lines 30 are located in the second circuit disposition space 400 and opposite to the first secondary spacing columns 15 and the second secondary spacing columns 22. The signal bus lines 30 can be configured to provide clock signals to the first gate driving circuit 14 and the second gate driving circuit 21.

In an embodiment of the disclosure, the display panel further can include the first secondary spacing column region and a second secondary spacing column. The first secondary spacing column region is fully distributed with the first secondary spacing columns 15. The second secondary spacing column region is fully distributed with the second secondary spacing columns 22. Specifically, the first secondary spacing column region is opposite to the first gate driving circuit 14 and the corresponding signal bus lines 30. In detail, the first secondary spacing columns 15 are fully filled above the first gate driving circuit 14 and the corresponding signal bus lines 30, in other words, the first secondary spacing column region/the first secondary spacing columns 15 is/are located above the first gate driving circuit 14 and the corresponding signal bus lines 30 and covering the first gate driving circuit 14 and the corresponding signal bus lines 30; the second secondary spacing column region is opposite to the second gate driving circuit 21 and the corresponding signal bus lines 30. In detail, the second secondary spacing columns 22 are fully filled above the second gate driving circuit 21 and the corresponding signal bus lines 30, in other words, the second secondary spacing column region/the second secondary spacing columns 22 is/are located above the second gate driving circuit 21 and the corresponding signal bus lines 30 and covering the second gate driving circuit 21 and the corresponding signal bus lines 30.

According to the display panel and the display device in the embodiment, the second substrate is formed with numerous secondary spacing columns. The gate driving circuit and the signal bus lines are disposed in the peripheral area of the first substrate. The sealing section, the numerous secondary spacing columns, the first substrate and the second substrate are utilized to form the circuit disposition space. The secondary spacing columns are fully disposed above the gate driving circuit and the signal bus lines to effectively isolate liquid crystal molecules and form the aforementioned circuit disposition space. The gate driving circuit, the signal bus lines and the secondary spacing columns are located in the circuit disposition space to reduce the RC load and the entire capacitance, and the secondary spacing columns and the gate driving circuit are separated to prevent the secondary spacing columns from scratching the gate driving circuit.

In an embodiment of the disclosure, as shown in FIG. 5, FIG. 6 and FIG. 7, the second sealant 16' can include: a first sealant 161' and a second sealant 162'. The second sealant 162', the first secondary spacing columns 15, the second secondary spacing columns 22, the first sealant 161', the first substrate 11 and the second substrate 12 together form the second circuit disposition space 400.

In an embodiment of the disclosure, as shown in FIG. 5, FIG. 6 and FIG. 7, the first sealant 161' is located on an external side of the second sealant 162'. The second sealant 162' is further configured to seal the liquid crystal layer 17. The design is benefit for narrowing the border of the display device as the sealing section can simultaneously form the circuit disposition space and seal the liquid crystal layer 17. Apparently, in another embodiment of the disclosure, the second sealant 162' can be merely for forming the circuit disposition space with the first secondary spacing columns 15, the second secondary spacing columns 22, the first sealant 161', the first substrate 11 and the second substrate 12 without sealing the liquid crystal layer 17, and the liquid crystal layer 17 is sealed in another way.

In an embodiment of the disclosure, as shown in FIG. 6, the first sealant 161' can further compass the second sealant 162', namely when the second sealant 162' surrounds the liquid crystal layer 17, the first sealant 161' encloses the second sealant 162'. The design can help reduce the difficulty of the manufacturing process because structures of the first sealant 161' and the second sealant 162' are the same. Apparently, in another embodiment of the disclosure, as shown in FIG. 5, the first sealant 161' can merely locate on two sides of the second sealant 162'. The design can save materials and benefit for the narrow border design of the display device.

In an embodiment of the disclosure, as shown in FIG. 8, the second sealing section 16' can include the first sealant 161'. The first sealant 161', the first secondary spacing columns 15, the second secondary spacing columns 22, the first substrate 11 and the second substrate 12 form the second circuit disposition space 400.

In an embodiment of the disclosure, as shown in FIG. 7 and FIG. 8, the first gate driving circuit 14 and the second gate driving circuit 21 locate on two opposite sides of the active switch array 13, namely the second side is opposite to the first side, in other words, the second side and the first side are two opposite sides of the active switch array 13. In practical application, in order to meet specific requirements, the second side and the first side can be disposed proximately or in another manner.

In an embodiment of the disclosure, as shown in FIG. 7 and FIG. 8, the display panel can further include the color filter layer. The color filter layer includes color photoresists 191; FIG. 7 and FIG. 8 show several color photoresists 191. The color photoresists 191 can be red, green, blue photoresists. The color filter layer is disposed on the second substrate 12. Apparently, in another embodiment of the disclosure, in order to increase the aperture ratio, the color filter layer can further be disposed on the first substrate 11, and the liquid crystal layer 17 is located on/above the color filter layer and the active switch array 13.

In an embodiment of the disclosure, the active switch array 13 includes thin film transistors. The gate driving circuit provides the voltage to gate electrodes of the thin film transistors.

In an embodiment of the disclosure, the GOA technology can be applied to integrate the gate driving circuit into the first substrate 11 for driving the active switch array 13 consisting of amorphous silicon (a-Si) thin film transistors; however, in various embodiments, the gate driving circuit integrated into the first substrate 11 by the GOA technology can further be used to drive the active switch array 13 consisting of polycrystalline silicon (poly-Si) thin film transistors. The poly-Si thin film transistors can be formed by technologies such as the low temperature poly-silicon (LTPS). Moreover, in other embodiments, the gate driving circuit can be integrated into the substrate by other methods.

In other embodiments of the disclosure, according to the practical requirement, the display panel can further include a third gate driving circuit and third secondary spacing columns. The third gate driving circuit is disposed on the first substrate 11 and located in the peripheral area BB. Specifically, the third gate driving circuit locates on a third side of the active switch array 13. The third gate driving circuit is connected to the active switch array 13 and configured to drive the active switch array 13 together with the first gate driving circuit 14 and the second gate driving circuit 21. The third secondary spacing columns are disposed on the second substrate 12 and opposite to the peripheral area BB. The sealing section, the third secondary spacing columns, the first second spacing columns 15, the second secondary spacing columns 22, the first substrate 11 and the second substrate 12 together form a circuit disposition space. The third secondary spacing columns are spaced from the third gate driving circuit with a third distance. In other words, the third distance is between the third secondary spacing columns and the third gate driving circuit. Optionally, the third side is different from the first side and the second side.

And in another embodiment of the disclosure, the display panel can further include a fourth gate driving circuit and fourth secondary spacing columns. The fourth gate driving circuit is disposed on the first substrate 11 and located in the peripheral area BB. Specifically, the fourth gate driving circuit locates on a fourth side of the active switch array 13. The fourth gate driving circuit is connected to the active switch array 13 and configured to drive the active switch array 13 together with the first gate driving circuit 14 and the second gate driving circuit 21. The fourth secondary spacing columns are disposed on the second substrate 12 and opposite to the peripheral area BB. The sealing section, the fourth secondary spacing columns, the third secondary spacing columns, the first secondary spacing columns 15, the second secondary spacing columns 22, the first substrate 11 and the second substrate 12 together form a circuit disposition space. The fourth secondary spacing columns and the fourth gate driving circuit locate in the circuit disposition space. The fourth secondary spacing columns are spaced from the fourth gate driving circuit with a fourth distance. In other words, the fourth distance is between the fourth secondary spacing columns and the fourth gate driving circuit. The fourth side is different from the first side, the second side and the third side. The disposition of the third gate driving circuit and the fourth gate driving circuit above is the same as the disposition of first gate driving circuit 14 and the second gate driving circuit 21 shown in FIG. 3, FIG. 4, FIG. 7 and FIG. 8. The disposition of the third secondary spacing columns and the fourth secondary spacing columns above is the same as the disposition of first secondary spacing columns 15 and the second secondary spacing columns 22 shown in FIG. 3, FIG. 4, FIG. 7 and FIG. 8, and repeat illustration is omitted herein.

In the embodiments of the disclosure, the sealing section and sealants are made out of sealant materials. Distribution densities of the first secondary spacing columns 15 and the second secondary spacing columns 22 are larger than the distribution density of the primary spacing columns 18 for effectively preventing the liquid crystal molecules from entering the circuit disposition space.

Figure 9:
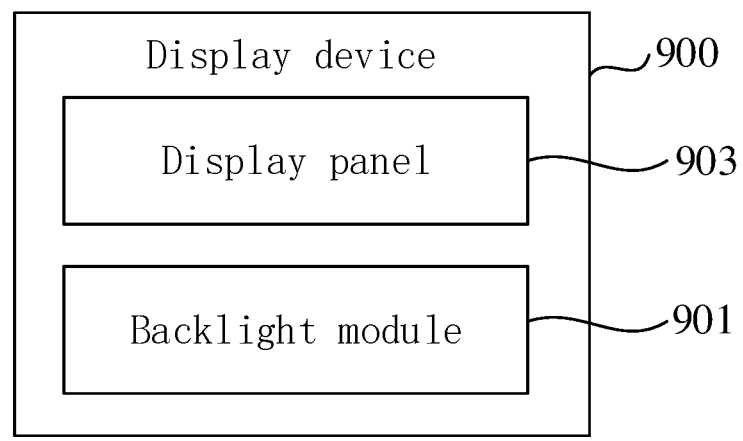
FIG. 9 is a schematic view of modules of a display device according to an embodiment of the disclosure.

FIG. 9 is a schematic view of modules of a display device according to an embodiment of the disclosure. As shown in FIG. 9, another embodiment of the disclosure further provides a display device 900, including: a backlight module 901 and a display panel 903. The display panel 903 adopts any one of the display panels in the embodiments above. The backlight module 901 is configured to provide backlight illumination to the display panel 903.

According to the formula of parallel capacitors $C=\varepsilon 0*\varepsilon r*A/d$, where $\varepsilon 0$ is a vacuum dielectric coefficient, $\varepsilon r$ is a relative permittivity of the material between polar plates, A is a relative coverage area of polar plates, and d is a distance between the polar plates. The gate driving circuit has liquid crystal molecules thereon, and the capacitance thereof is $\varepsilon 0*\varepsilon r*A/d$. But in the disclosure, the spacing columns are employed to separate the liquid crystal molecules to allow the gate driving circuit to locate in the circuit disposition space, and the capacitance is turned to be $\varepsilon 0*A/d$, lower than $\varepsilon 0*\varepsilon r*A/d$ in the prior art. The disclosure consequently can effectively reduce the capacitance of the gate driving circuit.

According to the display panel and the display device in the embodiment of the disclosure, the second substrate is formed with the secondary spacing columns. The gate driving circuit and the signal bus lines are disposed on the peripheral area of the first substrate. The sealing section, the secondary spacing columns, the first substrate and the second substrate are utilized to form the circuit disposition space. The secondary spacing columns are fully distributed above the gate driving circuit and the signal bus lines to effectively isolate liquid crystal molecules and form the aforementioned circuit disposition space. The gate driving circuit, the signal bus lines and the secondary spacing columns are located in the circuit disposition space to reduce the RC load and the entire capacitance, and the secondary spacing columns are separated from the gate driving circuit and the signal bus lines to prevent the secondary spacing columns from scratching the gate driving circuit.

Phrases such as "in some embodiments" and "in various embodiments" are repeatedly used, and the phrases commonly do not depict the same embodiment; but still can have an exception. Words of "include", "have" and "contain" are synonyms unless otherwise specified.

The embodiments described above purely optional embodiments of the disclosure rather than any restriction to the disclosure in any form. Although the disclosure has been disclosed as the optional embodiments above, the embodiments are not for limiting the disclosure. A person skilled in the art can obtain equivalent embodiments by modification according to the previously disclosed technical content within the spirit of the disclosure. Any simple modification and equivalence based on the technical content in the disclosure should still be contained in the scope of the disclosure.

What is claimed is:

1. A display panel comprising:
    a first substrate, comprising an active area and a peripheral area;
    a second substrate, disposed opposite to the first substrate;
    an active switch array, disposed on the first substrate and located in the active area;
    at least one gate driving circuit, disposed on the first substrate and located in the peripheral area, wherein the at least one gate driving circuit is connected to the active switch array and configured to drive the active switch array;
    at least one group of secondary spacing columns, disposed on the second substrate and opposite to the peripheral area; and
    a sealing section, comprising:
        a first sealant, disposed between the first substrate and the second substrate and located in the peripheral area; and
        a second sealant, disposed between the first substrate and the second substrate and located in the peripheral area; wherein the second sealant, the first sealant, the first substrate, the second substrate and the at least one group of secondary spacing columns together form a circuit disposition space;
    wherein the at least one group of secondary spacing columns and the at least one gate driving circuit are located in the circuit disposition space, and each group of the secondary spacing columns are spaced from a corresponding gate driving circuit; the gate driving circuit is in a vacuum and a load capacitance thereof is $C=\varepsilon 0*A/d$, where $\varepsilon 0$ is a vacuum dielectric coefficient, A is a relative coverage area of polar plates, and d is a distance between the polar plates;

wherein the first sealant and the second sealant define a gap therebetween, and the at least one group of secondary spacing columns are all located inside the gap and spaced from each of the first sealant and the second sealant;

wherein the display panel further comprises:
a plurality of primary spacing columns, disposed between the first substrate and the second substrate and corresponding to the active area, for forming a plurality of gaps between the first substrate and the second substrate; and
a color filter layer, disposed between the first substrate and the second substrate and corresponding to the active area; wherein the color filter layer comprises a plurality of color photoresists, and the plurality of primary spacing columns and the plurality of color photoresists are alternately arranged;

wherein a height of the plurality of primary spacing columns is larger than a height of the at least one group of secondary spacing columns.

2. A display panel comprising:
a first substrate, comprising an active area and a peripheral area;
a second substrate, disposed opposite to the first substrate;
an active switch array, disposed on the first substrate and located in the active area;
at least one gate driving circuit, disposed on the first substrate and located in the peripheral area, wherein the at least one gate driving circuit is connected to the active switch array and configured to drive the active switch array;
at least one group of secondary spacing columns, disposed on the second substrate and opposite to the peripheral area;
a sealing section, disposed between the first substrate and the second substrate, located in the peripheral area; wherein the sealing section, the first substrate, the second substrate and the at least one group of secondary spacing columns together form a circuit disposition space;
a plurality of primary spacing columns, disposed between the first substrate and the second substrate and corresponding to the active area, for forming a plurality of gaps between the first substrate and the second substrate; and
a color filter layer, disposed between the first substrate and the second substrate and corresponding to the active area; wherein the color filter layer comprises a plurality of color photoresists, and the plurality of primary spacing columns and the plurality of color photoresists are alternately arranged;

wherein the at least one group of secondary spacing columns and the at least one gate driving circuit are located in the circuit disposition space, and each group of the secondary spacing columns are spaced from a corresponding gate driving circuit;

wherein the at least one group of secondary spacing columns are all spaced from the sealing section.

3. The display panel according to claim 2, further comprising:
a plurality of signal bus lines, disposed on the first substrate and located in the peripheral area;
wherein the plurality of signal bus lines are connected to the at least one gate driving circuit, and the plurality of signal bus lines are located in the circuit disposition space.

4. The display panel according to claim 3, wherein the at least one group of secondary spacing columns are located above the at least one gate driving circuit and the plurality of signal bus lines and covering the at least one gate driving circuit and the plurality of signal bus lines.

5. The display panel according to claim 2, further comprising:
a liquid crystal layer, disposed between the first substrate and the second substrate and corresponding to the active area, wherein the liquid crystal layer comprises a plurality of liquid crystal molecules, the active switch array is configured to control a motion of the plurality of liquid crystal molecules; and
the sealing section comprising:
a first sealant, disposed between the first substrate and the second substrate and located in the peripheral area; and
a second sealant, disposed between the first substrate and the second substrate and located in the peripheral area; the second sealant, the at least one group of secondary spacing columns, the first sealant, the first substrate and the second substrate together form the circuit disposition space;
wherein the first sealant and the second sealant define a gap therebetween, and the at least one group of secondary spacing columns are all located inside the gap and spaced from each of the first sealant and the second sealant.

6. The display panel according to claim 5, wherein the first sealant is located on an external side of the second sealant, and the second sealant is further configured to seal the liquid crystal layer.

7. The display panel according to claim 6, wherein the first sealant compasses the second sealant; the at least one gate driving circuit is in a vacuum and a load capacitance thereof is $C=\varepsilon 0*A/d$, where $\varepsilon 0$ is a vacuum dielectric coefficient, A is a relative coverage area of polar plates, and d is a distance between the polar plates.

8. The display panel according to claim 2, wherein the display panel comprises two gate driving circuits, and the two gate driving circuits are located at two opposite sides of the active switch array.

9. The display panel according to claim 8, wherein the two gate driving circuits are connected to the active switch array and configured to drive the active switch array.

10. The display panel according to claim 2, wherein a height of the plurality of primary spacing columns is larger than a height of the at least one group of secondary spacing columns.

11. A display device comprising:
a backlight module; and
a display panel;
wherein the backlight module is configured to provide a backlight illumination to the display panel;
wherein the display panel comprises:
a first substrate, comprising an active area and a peripheral area;
a second substrate, disposed opposite to the first substrate;
an active switch array, disposed on the first substrate and located in the active area;
at least one gate driving circuit, disposed on the first substrate and located in the peripheral area, wherein the at least one gate driving circuit is connected to the active switch array and configured to drive the active switch array;
at least one group of secondary spacing columns, disposed on the second substrate and opposite to the peripheral area; and
a sealing section, disposed between the first substrate and the second substrate, located in the peripheral area; the sealing section, the first substrate, the second substrate and the at least one group of secondary spacing columns together form a circuit disposition space;
wherein the at least one group of secondary spacing columns and the at least one gate driving circuit are located in the circuit disposition space, and each group of the secondary spacing columns is spaced from a corresponding gate driving circuit;
wherein the at least one group of secondary spacing columns are spaced from the sealing section;
wherein the display panel further comprises:
a plurality of primary spacing columns, disposed between the first substrate and the second substrate and corresponding to the active area, for forming a plurality of gaps between the first substrate and the second substrate; and
a color filter layer, disposed between the first substrate and the second substrate and corresponding to the active area; wherein the color filter layer comprises a plurality of color photoresists, and the plurality of primary spacing columns and the plurality of color photoresists are alternately arranged.

12. The display device according to claim 11, wherein the display panel further comprises:
a plurality of signal bus lines, disposed on the first substrate and located in the peripheral area;
wherein the plurality of signal bus lines are connected to the at least one gate driving circuit, and the plurality of signal bus lines are located in the circuit disposition space.

13. The display device according to claim 12, wherein the at least one group of secondary spacing columns are located above the at least one gate driving circuit and the plurality of signal bus lines and covering the at least one gate driving circuit and the plurality of signal bus lines.

14. The display device according to claim 11, wherein the display panel further comprises:
a liquid crystal layer, disposed between the first substrate and the second substrate and corresponding to the active area, wherein the liquid crystal layer comprises a plurality of liquid crystal molecules, the active switch array is configured to control a motion of the plurality of liquid crystal molecules;
the sealing section comprising:
a first sealant, disposed between the first substrate and the second substrate and located in the peripheral area; and
a second sealant, disposed between the first substrate and the second substrate, located in the peripheral area; the second sealant, the at least one group of secondary spacing columns, the first sealant, the first substrate and the second substrate together form the circuit disposition space;
wherein the first sealant and the second sealant define a gap therebetween, and the at least one group of secondary spacing columns are all located inside the gap and spaced from each of the first sealant and the second sealant.

15. The display device according to claim 14, wherein the first sealant is located on an external side of the second sealant, and the second sealant is further configured to seal the liquid crystal layer.

16. The display device according to claim 15, wherein the first sealant compasses the second sealant; the at least one gate driving circuit is in a vacuum and a load capacitance thereof is $C=\varepsilon 0*A/d$, where $\varepsilon 0$ is a vacuum dielectric coefficient, A is a relative coverage area of polar plates, and d is a distance between the polar plates.

17. The display device according to claim 11, wherein the display panel comprises two gate driving circuits, and the two gate driving circuits are located at two opposite sides of the active switch array.

18. The display device according to claim 11, wherein a height of the plurality of primary spacing columns is larger than a height of the at least one group of secondary spacing columns.

* * * * *